3,421,847
MODIFICATION IN THE PRODUCTION OF CRYSTALLINE AMMONIUM PHOSPHATES
John Edward Such, Birmingham, and Derek Aubrey Palgrave, Doncaster, England, assignors to Electric Reduction Company of Canada Ltd., Islington, Ontario, Canada, a Canadian company
Continuation-in-part of application Ser. No. 364,210, May 1, 1964. This application Dec. 29, 1965, Ser. No. 517,309
Claims priority, application Great Britain, Jan. 14, 1965, 1,637/65; Oct. 21, 1963, 41,454/63; May 10, 1963, 18,576/63
U.S. Cl. 23—107                                              17 Claims
Int. Cl. C01b 25/28

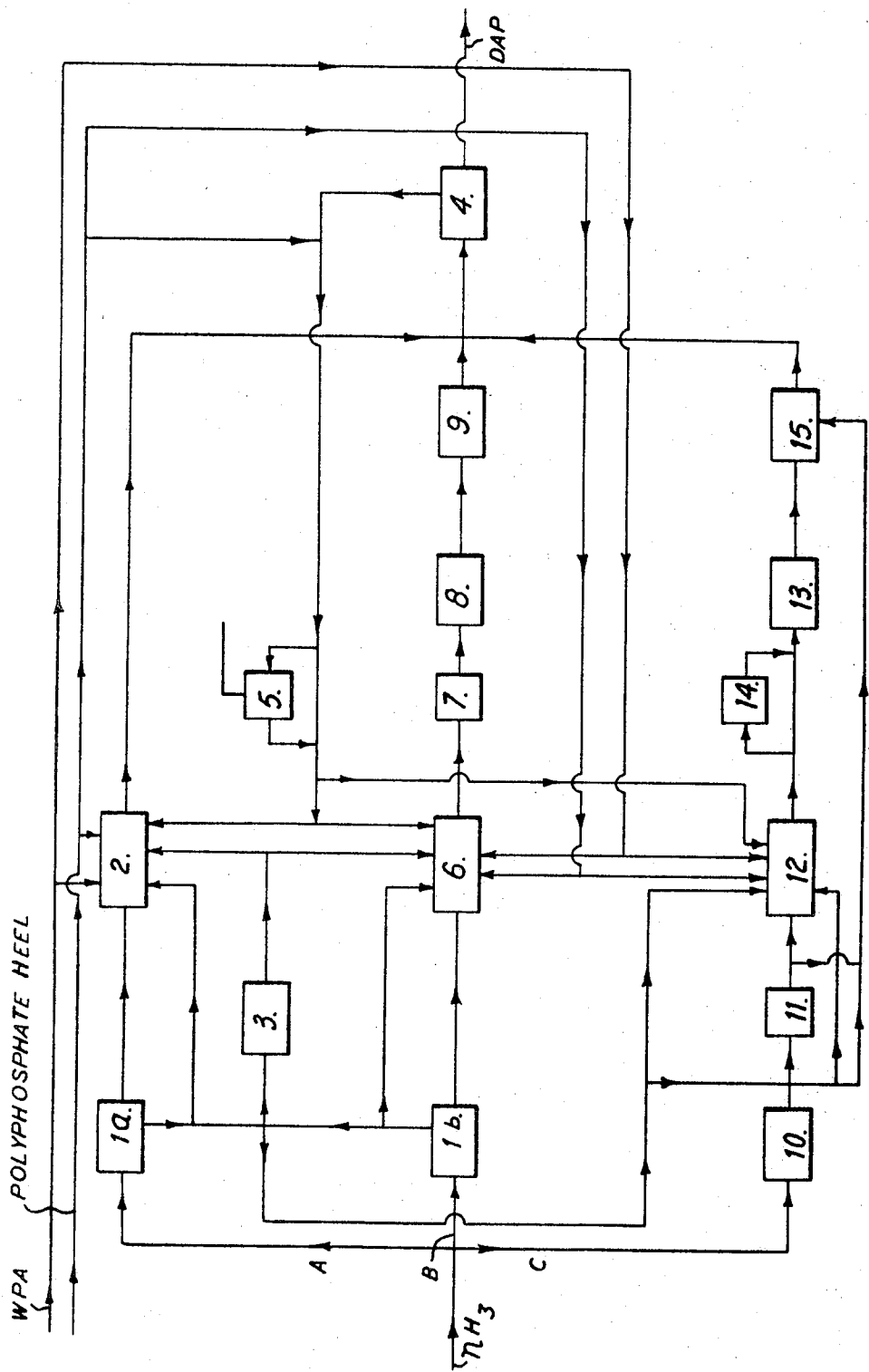

ABSTRACT OF THE DISCLOSURE

An improvement in the process for producing ammonium phosphate by reacting ammonia obtained from the destructive distillation of coal with wet process phosphoric acid, the improvement comprising reacting the ammonia with the phosphoric acid in the presence of an ammonium polyphosphate, a potassium polyphosphate, or a sodium polyphosphate.

---

The present invention relates to a process for the preparation of crystalline ammonium phosphates, for example diammonium phosphate and is a continuation in part of our copending application Serial No. 364,210 filed May 1, 1964.

The ammonia contained in the gas stream evolved during the destructive distillation of coal, as for example in a coke oven or a gas works, has long been known to be a source of low cost ammonia. However, there are many uses for which it has not hitherto been considered possible to employ such ammonia firstly because of the extra impurities (mainly $H_2S$) contained in such gas, and secondly because of the large quantity of extra water present in the aqueous solution, known as ammoniacal liquor, obtained by the water scrubbing of the gas stream.

It is known to make ammonium phosphates by the reaction of thermal phosphoric acid with either synthetic or gas works ammonia but, due to the high cost of the acid this has proved an expensive process for fertiliser production. It has therefore been suggested to use wet process phosphoric acid (hereinafter called WPA). However, with this acid it has not hitherto been possible to obtain a crystalline product on neutralisation with ammonia, even when this is pure synthetic ammonia, since the impurities present in WPA give rise to a gelatinous precipitate upon reaction with ammonia and also tend to inhibit crystallisation of the ammonium phosphates produced.

A further difficulty which arises when ammoniacal liquor is used, as opposed to gaseous ammonia, is the necessity of evaporating a considerable quantity of water, in the course of which loss of ammonia is liable to occur. In order to minimise this, it is known to carry out the neutralisation in two stages. In the first stage the neutralisation is carried to a nitrogen:phosphorus atomic ratio of about 1.35 or 1.45:1 and the resulting liquor is evaporated, the loss of ammonia being comparatively small, because the partial pressure of ammonia over the saturated solution at this ratio is small. After cooling, further ammonia is added to the concentrated liquor to increase the nitrogen:phosphorus ratio to about 2:1.

The product, which consists mostly of di-ammonium phosphate (hereinafter called DAP), has either been sold as a solution for direct application (or for use in a mixed fertiliser), or has been evaporated to dryness and granulated, the resulting product containing all the original impurities as insoluble matter. The formation of the gelatinous precipitate when using WPA has been prevented by the addition of polyphosphates to the liquor, but this has only been proposed for use in the preparation of liquid fertilisers; there was no question of forming crystals of ammonium phosphate. Even if this question had arisen, formation of crystals of ammonium phosphate could not have been expected, since polyphosphates not only do not remove the impurities but are themselves an impurity in an ammonium phosphate solution and would therefore have been expected to inhibit crystallisation of the ammonium phosphate.

We have now found that, contrary to general expectation, crystals of DAP may be obtained in the presence of polyphosphates by the reaction of WPA and the crude ammonia obtained by the destructive distillation of coal, in spite of the impurities present in this ammonia and in the WPA. This is a surprising effect since it would have been expected that the use of WPA and gas works ammonia in the production of DAP crystals would be impossible without purification of these materials. Our process provides commercially acceptable crystalline fertiliser materials from low cost reactants and also has the advantage of removing substantially all the ammonia and a proportion of the $H_2S$ from the gas stream. This is of importance in the purification of coal gas for domestic or industrial use. Moreover, our process provides an added advantage in that it has been shown that the $P_2O_5$ content associated with the basic impurities present in the reaction mixture takes the form of water soluble complexes. In obtaining crystals of ammonium phosphate from the reaction mixture certain amounts of these water soluble polyphosphate-base complexes are also obtained in the crystalline product. It is desirable that the water soluble $P_2O_5$ content of a fertiliser should be as high as possible. In commercially available fertilisers the water-soluble $P_2O_5$ content is often 2 to 5% less than that of the total $P_2O_5$ content. However, with ammonium phosphates produced by our process the total and water soluble $P_2O_5$ contents are substantially the same, thereby enhancing the value of the fertiliser.

The invention provides a process for the preparation of crystalline ammonium phosphates, which process comprises reacting wet process phosphoric acid with the impure ammonia obtained by the destructive distillation of coal, the reaction taking place in the presence of at least sufficient of a polyphosphate heel derived from a phosphoric acid having at least 75% by weight of $P_2O_5$, to enable crystals of ammonium phosphates to be obtained from the reaction mixture, and the atomic ratio of nitrogen to phosphorus in the liquor from which crystallisation takes place ranging between 1.5:1 and 2.0:1.

The ammonia obtained by the destructive distillation of coal may be utilised in the process of the invention in either the gaseous form, or in the form of the aqueous solution derived from the water scrubbing of the coal gas, known as ammoniacal liquor, which term is used throughout the specification. We have found that it is not necessary to ensure that all the tarry matter present in the gas stream is removed prior to reaction with the W.P.A.

When utilising the ammonia in gaseous form, wet process phosphoric acid is reacted at a temperature of below 75° C. with the impure ammonia-containing gas stream derived from the destructive distillation of coal after the amount of water present being adjusted so as to produce a reaction mixture supersaturated with respect to di-ammonium phosphate.

When using ammoniacal liquor the product of the reaction of the wet process acid with the ammoniacal liquor is evaporated to such a concentration that there is produced a solution which, after adjustment of the N:P ratio by the addition of further quantities of ammonia, would be super-saturated with respect to D.A.P. at room temperature. The N:P ratio of the concentrated liquor is then adjusted by the addition of further quantities of ammonia and cooled.

The ammonia may be obtained, for example, from the gas stream produced in a coke oven. This gas stream will contain a number of impurities, such as tars, $H_2S$, cyanides and phenols. The tars may be and preferably are removed by scrubbing the gas stream with water, which incidentally also removes about 30% of the ammonia in the gas stream. The gas stream is then used in the process of the invention as such without any further purification. The ammonia that is absorbed from the gas stream in the scrubber forms an aqueous layer above the tars and may be decanted off. This ammoniacal liquor may be added as such to the WPA reactor vessel in a sufficient quantity to provide the required amount of water. The remainder may be distilled, usually in the presence of lime, to provide gaseous ammonia which may be fed back into the gas stream. Alternatively the whole of the ammoniacal liquor may be treated in this latter way.

A third possibility is to react the ammoniacal liquor without gaseous ammonia with WPA. However, when this is done, it is preferred to employ ammoniacal liquor containing at least 10% by weight $NH_3$ and the weak solution obtained as above would require concentration by the process known as dephlegmation in order to attain such concentrations. It is, however, preferred to use conventional coke oven techniques for scrubbing a much greater proportion of the ammonia from the gas stream. The resulting ammoniacal liquor is again preferably concentrated to at least 10% before use.

The polyphosphate heel is present in the reaction mixture in an amount sufficient to enable D.A.P. crystals to be obtained from the reaction mixture. The amount required will depend on the amount of cationic impurities present in the acid. We have found that with merchant grade acid, i.e. a typical wet process phosphoric acid concentrated to 50–60% $P_2O_5$, the amount required may be as low as 1% by weight of the total $P_2O_5$ in the reaction mixture, but at such a low value the product would tend to be of poor quality with poor crystal growth. With the commonly available acids it is, therefore, preferred to use sufficient heel to provide from 3 to 25% by weight of the total $P_2O_5$ in the reaction mixture, amounts in this range providing satisfactory crystal formation.

The polyphosphate heel is conveniently prepared by the neutralisation of thermal acid or highly concentrated WPA having at least 75% by weight $P_2O_5$. The neutralisation may be carried out either with potassium hydroxide or ammonia, since both are of advantage in fertilisers. Alternatively sodium hydroxide and other bases may be used if desired, but such bases may provide cations, which are detrimental to fertilisers and are therefore not desirable. It is convenient to employ concentrated WPA and concentrated ammoniacal liquor containing more than 10% ammonia obtained, for example, elsewhere in the coke oven process, or from synthetic reagents.

Having prepared the heel of polyphosphates this may be stored in tanks before use, provided that the storage temperature does not exceed about 28° C. above which temperature hydrolisis of the polyphosphates may occur to an appreciable extent.

During the production of crystalline D.A.P. according to the process of the invention the amount of polyphosphate heel present in the reaction mixture will decrease due to losses caused by hydrolysis of the heel, the formation of polyphosphate base complexes and their co-crystallisation with the D.A.P., and the occlusion and drag out of polyphosphates with the crystals of D.A.P. These losses may be conveniently made up by adding the appropriate amount of heel to the recycling mother liquors. Or, where the process of the invention is operated at suitable temperatures, these losses may be made up by the addition of polyphosphate direct to the reaction mixture.

The wet process acid for present use may be of any of the grades which are normally available commercially, the concentration of the acid being adjusted to enable the water content of the reaction mixture to attain the level desired in each modification of the invention as discussed hereinafter and varies from 25 to 60% $P_2O_5$.

The object of the invention is to utilize as much ammonia as possible from the coal gas stream or ammoniacal liquor while producing a fertiliser in which the maximum amount of ammonia is combined per molecule of phosphoric acid. These two requirements tend to be contradictory, since the vapour pressure of ammonia not only increases, but increases very rapidly, as the N:P ratio increases from a value of about 1.3:1. If the conditions are such that mono-ammonium phosphate is formed, there will be a high recovery of ammonia but the N:P value of the product will be rather low. If, on the other hand, tri-ammonium phosphate is formed, there will be a low recovery of ammonia. Moreover, such a product loses ammonia on storage. The best compromise is a product consisting wholly or mainly of di-ammonium phosphate.

DAP is formed by the reaction of phosphoric acid and ammonia when the N:P ratio has a value of above 1.0 and predominates when the value is between 1.5 and 2.5. Beyond these limits mono- or tri-ammonium phosphates are produced in predominance. This sets the lower limit of 1.5:1 for the N:P ratio, but the upper limit should not be high enough for any significant amount of tri-ammonium phosphate to be formed. The upper limit of the N:P ratio consistent with this requirement is 2.0:1. As just mentioned, the lower limit of 1.5:1 for the N:P ratio in the process of the invention represents a compromise between the two requirements of maximum stripping of ammonia and production of a fertiliser with a maximum N:P ratio. Other considerations arise from the chemical engineering aspects of the process. The solubility of ammonium phosphates varies with the ratio of N:P present in the system. The maximum occurs at an N:P ratio of about 1.4:1 at 50° C. and the position of this maximum does not vary much at higher temperatures. However, saturated solutions at this maximum solubility may have too high a viscosity for convenient handling in the apparatus used when gaseous ammonia is employed in the process of the invention. A suitable compromise between the solubility and viscosity considerations is obtained at an N:P ratio of 1.5:1, which is the same as the lower limit for the production of a commercially acceptable product.

In the aspect of the invention where gaseous ammonia, in the form of the ammonia-containing gas stream, is used, the neutralisation of the WPA is conveniently carried out in a single reaction vessel from which the crystalline products are removed as they are formed and the mother liquor of the reaction mixture recycled.

While an acceptable product and workable operating conditions are obtainable with an N:P ratio from 1.5:1 to 2.0:1 in the reaction mixture, we have found that the optimum ratio is towards the upper end of this range, and we prefer to operate at a ratio of 1.7:1 to 1.9:1.

The N:P ratio may be conveniently controlled by the amount of acid introduced into the reaction mixture. The ammonia content of the gas stream is almost constant in the region of 1% and the composition of the recycled mother liquor is substantially that of a saturated solution of DAP with minor amounts of mono-ammonium phosphate, polyphosphate base complexes and the residue of the polyphosphate heel, and also remains substantially constant. Ideally the amounts of ammonia and acid added are in the molar ratios of 2:1 to form DAP. However, due to minor fluctuations in the composition of the recycled mother liquor and the ammonia content of the gas stream it is necessary to vary the amount of acid so as to maintain the desired N:P ratio in the reaction mixture. Similarly the amount of water present in the system may be controlled by the concentration of the acid, water being added to maintain a sufficient quantity of saturated DAP solution, there being water losses due to evaporation caused by the heat of reaction and the evaporative effect of the flow of the gas stream through the reaction mixture.

The choice of the temperature of the reaction mixture is also affected by the compromise between the various reaction conditions to enable the desired range of N:P ratios to be obtained since temperature affects the vapour pressure of ammonia over the reaction mixture. In order to obtain a sufficiently low ammonia slip at an N:P ratio of from 1.5 to 2.0:1 it has been found necessary to operate at a temperature of from 30° C. to 75° C. Within the preferred temperature range of 55 to 65° C. it is possible to operate at a N:P ratio of from 1.8 to 1.9:1 with an ammonia loss of only about 5%.

The reaction of the WPA and gaseous ammonia may take place in two main types of reactor; an absorber where the mixture of acid and recycled mother liquor is sprayed into the gas stream, the ammonia being absorbed therefrom, or in a saturator wherein the gas stream is passed through the said mother liquor and acid. Of the two types we prefer to employ the absorber type of vessel.

In view of the fact that the process is a compromise between various factors, ammonia is still present in the effluent gas stream in amounts of about 3 to 10% of that initially present and such amounts are too large to be tolerated in industrial or domestic gas supplies. It may therefore be necessary to pass the gas stream through a second reactor, or scrubber, which removes the final amounts of ammonia. This second vessel may be another WPA reactor which is now operated at a very much lower N:P ratio in order to remove substantially all the ammonia, or may be a sulphuric acid scrubber of known type. It is preferred to employ a sulphuric acid scrubber since this produces ammonium sulphate which may be blended with the DAP, produced in accordance with this aspect of our invention, to provide fertilisers having a range of nitrogen and phosphorus values.

In the aspect of the invention where ammoniacal liquor is employed as the ammonia reactant, a two stage neutralisation of the WPA is preferably used. In the first stage the neutralisation is carried out under very dilute conditions and at low N:P ratios; the resulting liquor is then concentrated by evaporation, and the crystalline DAP obtained from this solution after adjustment of N:P ratio and cooling for example in a chiller have been affected in the second stage. This two stage process minimises the ammonia loss on concentration of the ammonium phosphate solution before adjustment of the N:P ratio to complete the formation of DAP.

The value of the nitrogen to phosphorus atomic ratio for the first stage of neutralisation represents a compromise between the requirement of minimum loss of ammonia, which necessitates a low ratio, and the requirement of minimum breakdown of the polyphosphate, which necessitates a high ratio. We find that the best compromise is to employ N:P values of between 1.4 and and 1.5:1 preferably 1.45:1 which is near the point of maximum solubility of the ammonium phosphate system. The solution, after this first stage neutralisation, is evaporated, preferably until it has a concentration corresponding with saturation at 110–120° C. After the evaporation, further ammoniacal liquor is added to increase the nitrogen: phosphorus atomic ratio to a value between 1.5 and 2.0:1. Convenient values lie within the range 1.8:1 to 1.9:1. Although this addition of ammoniacal liquor increases the water content of the solution, it is possible to concentrate the liquor obtained in the first stage of neutralisation sufficiently to enable the further addition of ammoniacal liquor to be made without reducing the concentration below the value corresponding with saturation of DAP at room temperature. The further addition of ammoniacal liquor may take place before, during or after cooling of the partially neutralised concentrated liquor in a chiller, but addition after cooling is much to be preferred in order a prevent further loss of ammonia.

Some pre-concentration of the WPA and the ammoniacal liquor respectively may be desirable, since if too much water is present it may be difficult to produce the required super-saturated solution of DAP, and also too great a dilution may lead to decomposition of the polyphosphates. The initial concentration of WPA as normally produced is about 30% $P_2O_5$ and it is advantageous to concentrate it by normal commercial methods to 50% $P_2O_5$ or even higher for use in the invention.

The products obtained by the invention are in the form of a slurry of DAP crystals, together with a certain proportion of polyphosphate base complex in a mother liquor saturated with respect to DAP. This slurry may be obtained continuously from the reaction vessel in the first aspect, or the chiller in the second aspect, and the crystals then removed from the slurry, the mother liquor being recycled to the reaction vessel in which neutralisation of the WPA with ammonia takes place.

The separation of the crystalline product from the mother liquor may be achieved by conventional methods such as filtration or centrifuging.

The mother liquor comprises a solution saturated with respect to DAP and contains other materials such as a proportion of the polyphosphate base complexes, a certain amount of mono-ammonium phosphate and the residue of the polyphosphate heel. The composition of this recycled mother liquor remains substantially constant once equilibrium in the reaction cycle has been achieved. It has been established that the impurities present in the WPA, for example the iron, aluminum and calcium, form complexes with the polyphosphates present to provide water soluble materials and the amounts of these materials build up during the first few recycles of the mother liquor but then appear to reach a steady level since amounts extracted by co-crystallization of the complexes with the DAP equal the amounts of the various bases put into the reaction cycle.

As indicated above, it is preferred that the tarry matter should be removed from the ammonia-containing gas stream prior to reaction with the WPA. However, where this has not been done, it is desirable to carry out the processes of the invention in apparatus which is held at a sufficiently high temperature to maintain the tarry matter in a fluid form. Where chillers or coolers are used in the processes of the invention, the tarry matter is preferably removed before the reaction mixture reaches the chiller. In other cases the tarry matter may be removed from the recycling mother liquors prior to their reuse. The removal of the tarry matter may be achieved by any of the commonly used techniques, such as skinning or decanting the tars from the mother liquors.

During the reaction of the WPA with the impure ammonia a fine black precipitate of sulphides is formed due to the $H_2S$ present in the original gas stream and some, but not all, of this is occluded within the DAP crystals. However, the residue of this fine precipitate is not necessarily separated from the mother liquor during the recovery of the DAP crystals, since the efficiency of the separation of the fine precipitate from the mother liquor depends on the equipment used to recovery the crystalline product. Therefore, on prolonged operation of the process, a sludge of sulphides may accumulate which it is desired to remove. This may be effected by removing the sulphides either from the liquors from which crystallisation will later take place, for example by filtering the liquors issuing from the WPA reaction vessels, or from the recycling mother liquors by allowing the mother liquor to stand, when the sludge settles out and the mother liquor may be decanted therefrom, or by centrifugal or other techniques.

The viscosity of the liquor from which crystallisation occurs and the mother liquor which is to be recycled, in the process using gaseous ammonia, may be sufficiently great to present problems in handling these liquors. It is therefore preferred when that occurs and where the sulphide sludge is to be separated from the liquors by filtration that a modified process, which can be regarded as a combination of the absorption process using gas-steam ammonia and the evaporation process used with ammoniacal liquor, may be employed. This modified process comprises neutralising the WPA with gaseous ammonia to give an aqueous solution of ammonium phosphates which is not saturated with respect to DAP, removing the sulphides produced during the reaction by filtration, subsequently concentrating the resulting mother liquor to give a solution which is supersaturated with respect to DAP and recovering the crystals of DAP therefrom. The ammonia is reacted with the WPA to give an unsaturated solution of inter alia DAP. The N:P ratio employed may be from 1.5 to 2.0:1 but in view of ammonia losses during the evaporation stage it is prefered to operate at low N:P values for example 1.5 to 1.6:1 to minimise such losses.

The evaporation may be carried out by conventional methods such as heating, for example at from 110 to 120° C. as with the process of the second aspect of the invention, or by vacuum techniques. The crystalline product is recovered and the mother liquor recycled as in the unmodified process using gas-stream ammonia.

The invention will now be described by way of example with reference to the accompanying drawing which represents a flow diagram of the three processors of the invention. In the process using gaseous ammonia the ammonia-containing gas stream.

(A) obtained from a coke oven is fed into a tar stripper 1a which removes the tars from the gas stream and incidentally also removes about 30% of the ammonia as a very dilute ammoniacal liquor containing about 1½% by weight ammonia. The stripped gas stream is then passed into an absorber 2 into which are fed the appropriate amounts of WPA and polyphosphate heel to give an N:P ratio in the absorber 2 of about 1.9:1. The water balance in the absorber 2 is adjusted so as to maintain the reaction mixture super-saturated with respect to DAP and yet one which is comparatively easy to handle. This may be achieved by varying the concentration of the WPA used, or by adding the required amounts of the dilute ammoniacal liquor obtained from the tar stripper 1a. The amount of ammoniacal liquor produced in the tar stripper 1a is usually in excess of that required to maintain the water balance in the absorber 2 and the excess is passed to an evaporator 3 where the liquor is distilled in the presence of lime to give ammonia gas which is then fed back into the gas stream entering the absorber 2. The slurry of DAP crystals and liquor issuing from the absorber 2 is fed to a separator 4 where crystals of DAP are separated from the mother liquor which is then recycled to the absorber 2. The recycled mother liquor may be freed from the sulphides formed during the reaction of the WPA and ammonia by passing the liquor through a separator 5, such as a centrifuge, before feeding it back into the absorber 2. The polyphosphate heel losses during the cycle of the process may be made up by adding the requisite amounts of the heel to either the absorber 2 or, more preferably to the recycling mother liquor.

In the process where the sulphides are separated by filtration from the reaction mixture issuing from the absorber 2 the process is modified to give the following process: the ammonia containing gas stream (B) is passed through a tar stripper 1b and the stripped gas reacted with WPA in an absorber 6 which is now operated at an N:P ratio of about 1.6:1 and under such conditions as will give a reaction product liquor which is not saturated with respect to DAP. This reaction liquor is then filtered free from sulphides in a filter 7 and subsequently evaporated in an evaporator 8, operated at a temperature of from 110 to 120° C., to give a liquor which corresponds to a solution super saturated with respect to DAP at room temperature. This super saturated liquor is then cooled to room temperature in a chiller 9 before the crystals of DAP are recovered in the separator 4. As before the mother liquor may be recycled to the absorber 6 but in this case no separation of sulphides from the mother liquor is required in the separator 5. The dilute ammoniacal liquor obtained incidentally from the tar stripper 1b may be added to the absorber 6 to maintain the desired water balance or distilled in the presence of lime in the evaporator 3 to yield gaseous ammonia which may be fed into the ammonia gas stream entering the absorber 6. The polyphosphate losses are made up as before.

In the process of the invention where ammoniacal liquor is reacted as such, with WPA the ammonia-containing gas stream (C) is passed to a water scrubber 10 which removes about 99% of the ammonia from the gas stream in the form of ammoniacal liquor containing about 1½% by weight ammonia. This liquor is decanted off from the tarry matter. Usually this liquor is too dilute for satisfactory use in the present process and is therefore concentrated in a dephlegmater 11 to give a solution containing at least 10% by weight of ammonia. This concentrated liquor, or, in certain cases where it is concentrated enough, the original liquor, is fed to a reaction vessel 12 where reaction between the WPA and ammonia occurs, sufficient of the polyphosphate heel being added to enable satisfactory crystals of DAP to be obtained later. The reaction vessel is operated at an N:P ratio of about 1.4:1, which may be obtained by controlling the amount of WPA added. Minor adjustments may also be achieved by the use of the ammoniacal liquor from the tar separators 1a and 1b used in the gaseous ammonia process described above, after concentration in the dephlegmater 11 if necessary.

The water balance of the reaction vessel is maintained at a level which provides an effluent liquor which is as near super saturation with respect of DAP as is possible. However since the water content of the ammoniacal liquor is usually of the order of 75% to 90% super saturation is not possible. The reaction product liquor is then passed to an evaporator 13 operated at a temperature of from 110° to 120° C. to provide a liquor which corresponds to a solution super saturated with respect to DAP at room temperature. The sulphides may conveniently be separated from the liquor issuing from the reactor 12 before further treatment occurs by passing the liquor through a separator 14, such as a centrifuge.

The concentrated liquors are then cooled to room temperature in a chiller 15. The N:P ratio of the liquor is adjusted either before cooling or more preferably, after cooling to a value of about 1.9:1. This adjustment may be achieved by the addition of ammoniacal liquor, either concentrated or crude, to the liquor.

Although the ammoniacal liquor which is to be added contains a very large proportion of water, its is possible to concentrate the reaction product liquor sufficiently for the adjusted liquor to remain super saturated with respect to DAP. The adjusted liquor is then fed to the separator 4 where the crystalline DAP is recovered. The resulting mother liquor may be recycled to the reaction vessel 12 with removal of sulphides in separator 5 if necessary. The polyphosphate heel losses may be made up as before.

We claim:

1. In the process for producing ammonium phosphates by reacting wet process phosphoric acid with impure ammonia obtained by the destructive distillation of coal, the improvement comprising reacting said ammonia with said phosphoric acid in the presence of sufficient of at least one polyphosphate selected from the group consisting of ammonium polyphosphate, potassium polyphosphate, and sodium polyphosphate obtained from phosphoric acid concentrated to at least 75% $P_2O_5$ to enable crystals of ammonium phosphates to be crystallized from the reaction mixture, and then crystallizing ammonium phosphates from the liquid reaction mixture having an atomic ratio of nitrogen to phosphorus of from 1.5:1 to 2.0:1.

2. A process according to claim 1 wherein said polyphosphate is present in sufficient amount to provide from 1 to 25% by weight of the total $P_2O_5$ present in the reaction mixture.

3. A process according to either of claims 1 or 2 wherein said polyphosphate employed in ammonium or potassium polyphosphate.

4. A process according to claim 1 wherein the wet process acid has a concentration of from 25% to 55% by weight of $P_2O_5$.

5. A process according to claim 1 wherein the reaction is carried out at a temperature of from 30° C to 75° C.

6. A process according to claim 1 wherein any tarry matter present in the ammonia containing gas stream is removed therefrom before it is treated with the wet process acid.

7. A process according to claim 1 wherein the ammonia is used in the form of the ammonia-containing gas stream obtained by the removal of tarry matters from the gaseous products of the destructive distillation of coal.

8. A process according to claim 7 wherein the ammonia is reacted with wet process acid in such amounts that the atomic ratio of nitrogen to phosphorus in the reaction mixture is from 1.7:7 to 1.9:7.

9. A process according to claim 7 wherein the water content of the reaction mixture is such that a solution super saturated with respect to diammonium phosphate is obtained by the reaction of the impure ammonia with wet process acid.

10. A process according to claim 1 wherein the ammonia is employed in the form of the dilute aqueous solution obtained by the water scrubbing of the gases generated by the destructive distillation of coal.

11. A process according to claim 10 wherein the ammonia is reacted with the wet process phosphoric acid at an atomic ratio of nitrogen to phosphorus of from 1.4:1 to 1.5:1; the resulting liquid product is evaporated to such a concentration that there is produced a solution which after adjustment of the N:P ratio would be supersaturated with respect to diammonium phosphate at room temperature; further ammoniacal liquor is added to the concentrated solution to increase the atomic ratio of nitrogen to phosphorus to a value between 1.5:1 and 2.0:1 while maintaining super saturation of the solution with respect to diammonium phosphates and before, during or after such addition the solution is cooled; and the resulting ammonium phosphate crystals recovered from the cooled liquor.

12. A process according to claim 11 wherein the atomic ratio of nitrogen to phosphorus in the evaporated liquor is adjusted to from 1.8:1 to 1.9:1.

13. A process according to claim 11 wherein the adjustment of the nitrogen to phosphorus ratio is made after the evaporated liquor has been cooled to room temperature.

14. A process according to claim 11 wherein the ammonia solution is concentrated before use so as to contain at least 10% by weight of ammonia.

15. A process according to claim 11 wherein the evaporation is carried out at a temperature of from 110° C. to 120° C. at atmospheric pressures.

16. A process according to claim 7 wherein the ammonia-containing gas stream is reacted with wet process acid at an atomic ratio of nitrogen to phosphorus of from 1.5:1 to 1.6:1, the water content of the reaction mixture being such that the resulting solution of ammonium phosphates is not saturated with respect to diammonium phosphate; this solution is filtered to remove the sulphides formed during the reaction; then evaporated to give a solution which is super saturated with respect to DAP; and the ammonium phosphate crystals are recovered therefrom.

17. A process according to claim 16 wherein the evaporation is carried out at a temperature of from 110 to 120° C.

References Cited

UNITED STATES PATENTS

| | | | |
|---|---|---|---|
| 1,670,504 | 5/1928 | Griessbach et al. | 23—107 |
| 3,152,574 | 10/1964 | Achorn et al. | 23—107 |
| 2,921,837 | 1/1960 | Helm | 23—107 |
| 2,946,655 | 7/1960 | Helm et al. | 23—107 |
| 3,063,802 | 11/1962 | Maloy | 23—107 |
| 3,115,390 | 12/1963 | Jadot | 23—107 |

EARL C. THOMAS, *Primary Examiner.*

LUTHER A. MARSH, *Assistant Examiner.*

UNITED STATES PATENT OFFICE
CERTIFICATE OF CORRECTION

Patent No. 3,421,847

January 14, 1969

John Edward Such et al.

It is certified that error appears in the above identified patent and that said Letters Patent are hereby corrected as shown below:

Column 9, line 6, "in" should read -- is --; line 29, the ratios "1.7:7 to 1.9:7" should read -- 1.7:1 to 1.9:1 --.

Signed and sealed this 17th day of March 1970.

(SEAL)
Attest:

Edward M. Fletcher, Jr.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,421,847                    Dated January 14, 1969

Inventor(s) JOHN EDWARD SUCH and DEREK AUBREY PALGRAVE

It is certified that error appears in the above-identified patent and that said Letters Patent are hereby corrected as shown below:

Column 9, line 11, "in" should read --is--; line 29, the ratios "1.7:7 to 1.9:7" should read --1.7:1 to 1.9:1--.

This certificate supersedes Certificate of Correction issued March 17, 1970.

SIGNED AND
SEALED
JUN 2 1970

(SEAL)
Attest:

Edward M. Fletcher, Jr.
Attesting Officer

WILLIAM E. SCHUYLER, JR.
Commissioner of Patents